United States Patent [19]

Bowling

[11] Patent Number: 4,783,914

[45] Date of Patent: Nov. 15, 1988

[54] STUMP REMOVER

[75] Inventor: Mark G. Bowling, Dalton, Ohio

[73] Assignee: Limbco, Inc., Orville, Ohio

[21] Appl. No.: 927,274

[22] Filed: Nov. 4, 1986

[51] Int. Cl.$^4$ ............................................. A01G 23/06
[52] U.S. Cl. ........................................ 37/2 R; 144/2 N
[58] Field of Search .......... 37/2 R; 241/101.7, 282.2;
144/2 N; 56/320.1, 320.2

[56] References Cited

U.S. PATENT DOCUMENTS

| | | | |
|---|---|---|---|
| 2,963,842 | 12/1960 | Estes | 56/320.1 |
| 3,123,112 | 3/1964 | Hodges et al. | 144/2 N |
| 3,336,958 | 8/1967 | Carlton | 144/2 N |
| 3,378,995 | 4/1968 | Welsh | 56/320.1 |
| 3,929,236 | 12/1975 | Koturov | 241/101.7 |
| 4,074,869 | 2/1978 | Johnson | 241/101.7 |
| 4,170,267 | 10/1979 | Bourlier | 37/142 R |
| 4,187,626 | 2/1980 | Greer et al. | 37/142 R |
| 4,402,352 | 9/1983 | Hodges | 144/2 N |
| 4,525,989 | 7/1985 | Lane et al. | 56/320.1 |
| 4,697,625 | 10/1987 | Bolton | 144/2 N |

*Primary Examiner*—David Wiecking
*Assistant Examiner*—James Lisehora
*Attorney, Agent, or Firm*—Renner, Otto, Boisselle & Sklar

[57] ABSTRACT

A stump remover for cutting and grinding tree stumps and roots comprising a rectangular-shape housing which serves to support and contain the various elements of the stump remover. At the aft end of the housing is mounted a power source, preferably an internal combustion engine, which provides rotational energy to the cutting assembly at the fore end of the housing. The cutting assembly comprises a drive shaft which is mounted within the housing at an angle of approximately 61 degrees relative to the top of the housing. The end of the shaft is provided with four radially extending and equally spaced carbide teeth. Each of the teeth includes a bent portion which forms an angle of approximately 45 degrees with the axis of the drive shaft. For the transmission of rotational energy from the power source to the cutting assembly, preferably a cog V-belt is provided. The aft end of the housing further includes a wheel assembly which is mounted slightly behind the center of gravity of the power source so as to cause the housing to rotate forward bringing the cutting assembly in contact with the ground. To assist a user in overcoming the tendency of the housing to tip or rotate forward and allow the user to control the cutting depth, the aft end of the housing further includes a footrest and a handle bar assembly.

12 Claims, 3 Drawing Sheets

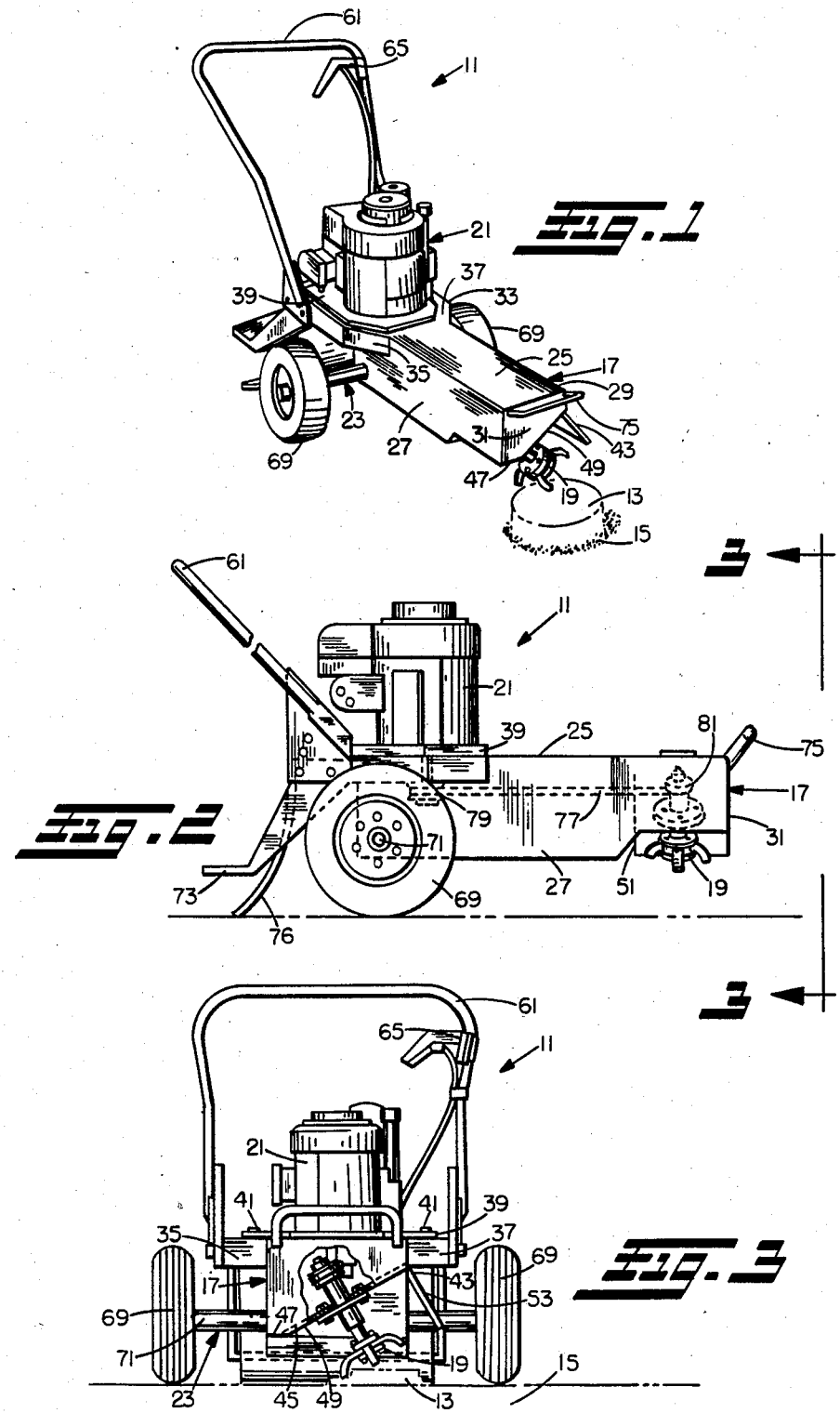

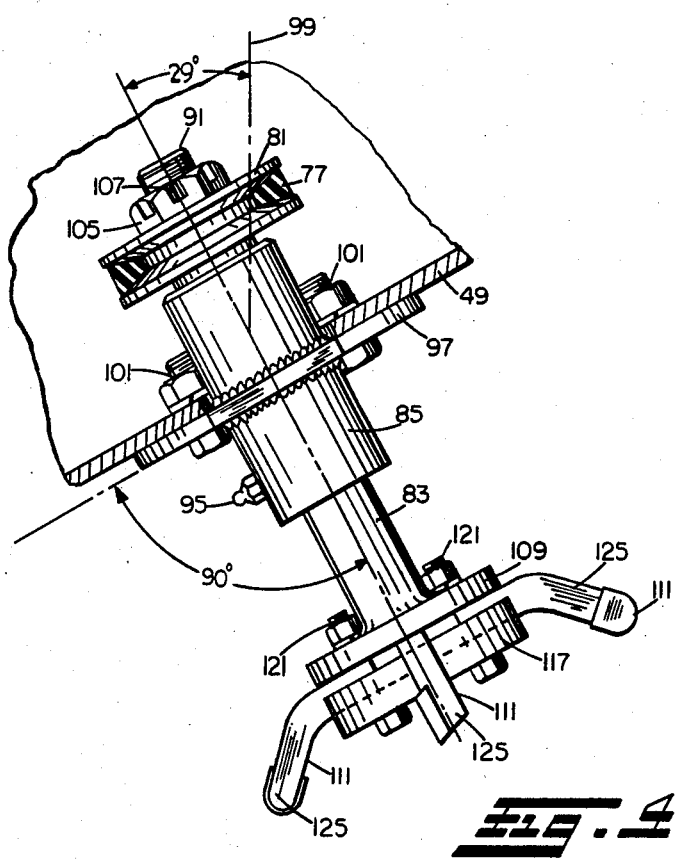
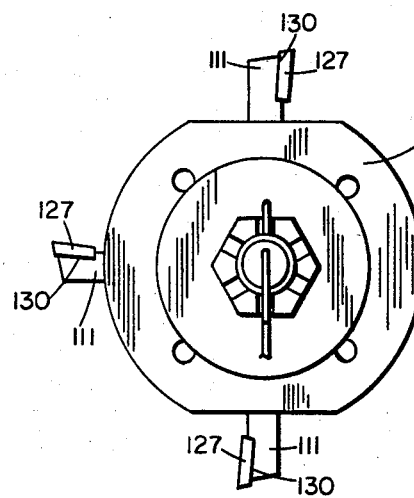
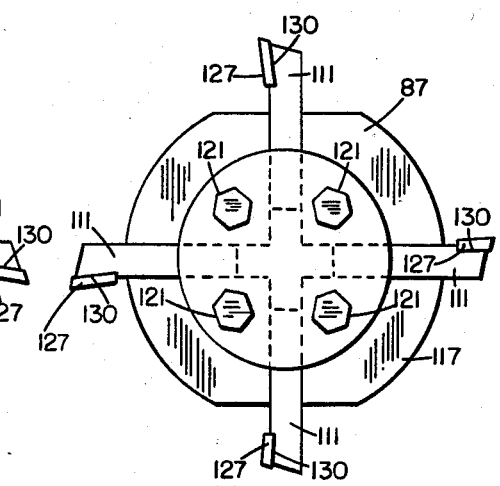

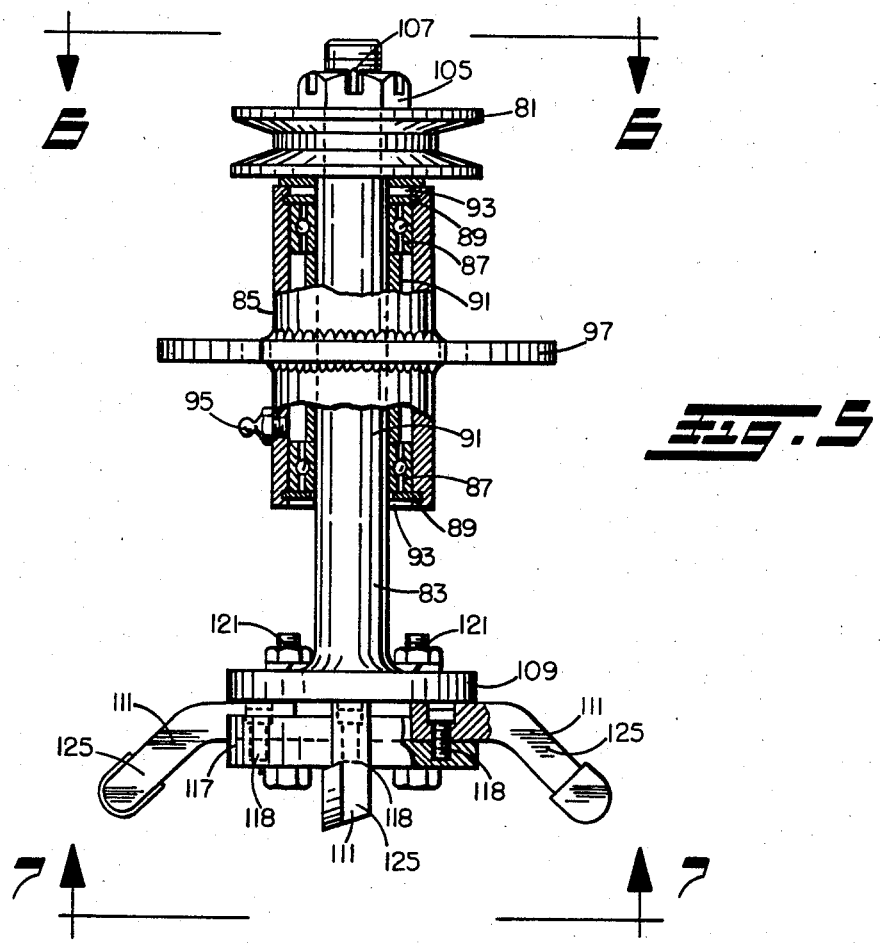

STUMP REMOVER

This invention relates generally to a stump remover. More particularly, this invention relates to a portable stump remover for cutting and grinding tree stumps and roots situated in the ground or dirt.

BACKGROUND

The prior art provides various devices which serve as stump removers. One such device comprises a large power driven circular blade, generally in excess of six feet, having a plurality of protruding cutting teeth attached thereto. Another device employs a plurality of smaller sized circular blades evenly spaced along a horizontal rotating axle.

Unfortunately, such prior art devices present various disadvantages and drawbacks. Specifically, such devices are quite cumbersome and large, sometimes failing to provide a user with the requisite degree of portability. Additionally, such devices can be quite difficult to operate and control, requiring extensive operator training. Also, such prior art devices can be quite expensive to fabricate.

The present invention provides a portable stump remover which overcomes these disadvantages and drawbacks associated with the prior art devices.

SUMMARY OF THE INVENTION

The present invention provides a portable stump remover for cutting and grinding tree stumps and roots situated in the ground. A stump remover made in accordance with the present invention provides various advantages including ease of operation, relatively low fabrication costs, high speed cutting and grinding, and a high degree of portability which allows a user to utilize the stump remover in areas which were previously inaccessible to prior art stump removers.

Generally, in a preferred embodiment, a stump remover made in accordance with the present invention comprises a rectangular-shape housing for supporting and containing the various elements of the stump remover. Such elements include a power source, preferably an internal combustion motor, which is mounted on the top of the housing at the aft end thereof. The power source provides rotational energy to the cutting assembly which is located at the fore end of the housing.

The cutting assembly comprises a drive shaft which rotates within a bearing assembly and housing mounted to the fore end of the rectangular-shape housing. Preferably, the cutting assembly is oriented within the rectangular-shape housing such that the axis of the drive shaft forms an angle of about 61 degrees with the horizontal top of the rectangular-shape housing and the horizontal surface of the ground. Applicant has found this mounting angle provides optimum cutting and grinding performance with the cutting teeth moving through the wood in a circular path, the plane of which is at about 61 degrees to the vertical grain of the wood in a tree stump. At the end of the drive shaft are mounted four radially extending and equally spaced cutting teeth. The teeth include a bent portion which forms an angle of approximately 45 degrees with the axis of the drive shaft. Providing the teeth with such bent portion further enhances the performance of the cutting assembly. Each of the teeth ends is preferably provided with a carbide tip so as to maximize the service life of the teeth.

For the transmission of the rotational energy from the power source to the cutting assembly, a cog V-belt is provided which interconnects the output shaft of the power source to the drive shaft of the cutting assembly. The V-belt provides various distinct advantages over other types of transmission devices. Specifically, such advantages include the ability of the V-belt to flex and accomodate the angle of the cutting assembly, the ability of the V-belt to slip and minimize damage in the event the teeth of the cutting assembly should contact an immovable obstruction, and the ease of replacement of such V-belt at a nominal cost when it becomes worn.

To facilitate the portable movement of the stump remover, the aft end of the rectangular-shape housing includes a wheel assembly comprising an axle having a pair of wheels mounted on the ends thereof. Preferably, the axle of such wheel assembly is mounted slightly behind the center of gravity of the power source such that the rectangular-shape housing has a tendency to rotate forward bringing the cutting assembly in contact with the ground, or more appropriately, the tree stump or root. Such a mounting location for the wheel assembly has been found to enhance the operation of the stump remover.

Also included at the aft end of the housing is a handle assembly and footrest. The handle assembly allows a user to overcome the tendency of the housing to tip forward, thus allowing a user to control the depth of cut of the cutting assembly. When the unit is started, the user's foot on the footrest elevates the cutter assembly off of the ground providing sufficient clearance for the cutting assembly. Preferably, mounted upon the handle assembly is a deadman's switch which cuts off the power source when the user removes his hand therefrom.

To accomplishment of the foregoing and related ends the invention, then, comprises the features hereinafter fully described and particularly pointed out in the claims, the following description and the annexed drawings setting forth in detail certain illustrative embodiments of the invention, those being indicative, however, of but a few of the various ways in which the principles of the invention may be employed.

BRIEF DESCRIPTION OF THE DRAWINGS

FIG. 1 is a perspective view of a stump remover made in accordance with the present invention;

FIG. 2 is a side elevational view of the stump remover of FIG. 1;

FIG. 3 is an end view of the stump remover of FIG. 2 taken along line 3—3 thereof, partially broken away so as to fully illustrate the cutting assembly;

FIG. 4 is a fragmentary elevational assembly view of the cutter assembly of FIG. 3 illustrated in its angled position;

FIG. 5 is a partially broken away side elevational assembly view of the cutter assembly of FIG. 3 illustrated in the vertical or upright position;

FIG. 6 is a top view of the cutter assembly of FIG. 5 take on line 6—6 thereof; and FIG. 7 is a bottom view of the cutter assembly of FIG. 5 taken along line 7—7 thereof.

DETAILED DESCRIPTION OF THE PREFERRED EMBODIMENT

Referring to the drawings and initially to FIGS. 1-3, there is illustrated a stump remover 11 made in accordance with the present invention. As shown in FIGS.

1-3, the stump remover 11 is suited for use in the cutting, grinding and chipping away of tree stumps 13 situated in the ground 15. Although not illustrated, stump remover 11 is equally suited for the grinding and removal of tree roots. Generally, stump remover 11 comprises a rectangular-shape housing 17 which serves to contain or support the various elements of the stump remover. Such elements include a cutting assembly 19 which contacts the stump or root and grinds and chips it away, a power source 21 for providing the necessary rotational energy to the cutting assembly 19, and a wheel assembly 23 which facilitates the quick and easy movement of the stump remover from one location to another.

As illustrated, power source 21 preferably comprises an internal combustion engine with a horizontal stroke piston. An internal combustion engine provides various advantages over other conventional power sources because it is completely self-sufficient and portable, and it is capable of supplying significant amounts of energy to facilitate the rotation of the cutting assembly 19. It will be appreciated, however, that various other types of power sources may be utilized in conjunction with the present invention including, but in no way limited to, electric motors, diesel engines, rotary engines, and the like.

Housing 17 comprises a top plate 25, a pair of side plates 27 and 29, and an end plate 31. Preferably, plates 25, 27, 29 and 31 are made of a metal such as steel and are integrally connected to one another by welds extending along their adjoining edges. Of course, additional means of securing the various plates to one another may include, for example, the use of fasteners and interconnecting structural web reinforcements.

At its aft end, the housing 17 includes a platform 33 which serves as a mounting base for the power source 21. As illustrated, the platform 33 comprises a pair of protruding arms 35 and 37 connected respectively at one end (preferably by welding) to the side plates 27 and 29. Platform 33 further includes a plate 39 upon which the power source 21 is secured. Preferably, as illustrated, the plate 39 is attached to the arms 35 and 37 with bolts 41. Furthermore, preferably plate 39 is provided with oversized openings or slots through which bolts 41 extend so as to allow a user to adjust the position of the plate 39 and power source 21 relative to the cutter assembly 19.

At its fore end, the housing 17 includes an L-shape plate 43 upon which the cutting assembly 19 is mounted. Plate 43 includes a leg 45 having a straight portion 47 welded at its end to the side plate 27, and an angled portion 49 welded to the end plate 31. Side plate 27 includes a notch 51 which accomodates the mounting of the plate 43 and provides sufficient access for the cutter assembly 19 to engage a stump or root. The straight portion 47 of leg 45 extends at a right angle relative to the side plate 27 of the rectangular-shape housing 17. Preferably, the angled portion 49 of leg 45 extends such that a plane formed by angled portion 49 and a plane formed by straight portion 47 intersect to form an angle of approximately 19 degrees to 39 degrees. Preferably, however, such angle is approximately 29 degrees. Since the cutting assembly 19 is mounted to the angled portion 49 of leg 45, the major vertical axis of the cutting assembly 19 extends at an angle of approximately 19 degrees to 39 degrees relative to the side plates 27 and 29 of housing 17. Preferably, however, such cutting assembly 19 extends at an angle of approximately 29 degrees relative to side plates 27 and 29. Mounting the cutting assembly 19 at approximately a 29 degree angle has been found to optimize the cutting and grinding performance of the assembly.

L-shape plate 43 further includes a leg 53 which protrudes at a right angle relative to the angled portion 49 of leg 45 beyond the confines of the rectangular-shape housing 17. Leg 53 serves to help capture any flying chips of wood which may be generated by the cutting assembly 19.

The stump remover 11 further includes a tubular handle 61 which is mounted at each of its ends to the arms 35 and 37 of the platform 33 via brackets 63 which allows handle 61 to assume a variety of angled positions. Preferably, mounted upon handle 61 is a safety cutoff switch 65 which shuts down the power source 21 when released from the grip of a user's hand.

Wheel assembly 23 comprises a pair of pneumatic tires 69 mounted for rotation at the ends of axle 71. Axle 71 extends through and is mounted to the side plates 27 and 29 of rectangular-shape housing 17. Preferably, axle 71 is mounted at the aft end of housing 17, slightly behind the center of gravity of power source 21, such that the weight of power source 21 causes the housing 17 to pivot forward upon axle 71. Thus, cutting assembly 19 is continuously urged towards the ground 15. It will be appreciated that the exact location at which the axle 71 is mounted to cause the housing 17 to pivot forward will be a function of various factors including the length of the housing, the relative weight distribution of the housing, the weight of the power source and cutting assembly, and other like factors.

To assist the user in overcoming the tendency of the housing 17 to rotate forward on axle 71, a downwardly and rearwardly extending footrest 73 is attached to arms 35 and 37. During the starting of the power source 21 (typically via a pull cord mechanism), footrest 73 allows a user to place his foot thereon and provide the requisite force to overcome the tendency of the housing 17 to tip forward thus allowing cutter assembly 17 to clear the ground. To assist a user in lifting the stump remover, for example, into a truck, the fore end of the rectangular-shape housing 17 further includes a handle 75. Also, preferably a hinged piece of plastic matting 76 is provided ahead of the footrest 73 to protect the feet of the user from any flying debris eminating from cutting assembly 19.

As illustrated in FIG. 2, the rotational energy generated by power source 21 is preferably transmitted to the cutting assembly 19 utilizing a cog V-belt 77. Although this invention contemplates the use of various energy transmission devices such as gears, chains, standard V-belts, or the like, cog V-belt 77 provides various distinct advantages. Specifically, cog V-belt 77 flexes or twists to accomodate the twisted alignment of drive pulley 79 and input pulley 81. Thus, power source 21 can operate in a horizontal plane (which maximizes the life of a horizontal stroke internal combustion engine) even though cutting assembly 19 is positioned at an angle. Cog V-belt 77 provides a further advantage in that in the event cutting assembly 19 should strike an obstruction, cog V-belt 77 will merely slip on pulley 81 helping to prevent the breakage of cutting assembly 19. As cog V-belt 77 stretches during its life, the V-belt 77 can be retensioned by simply loosening bolts 41 and readjusting the position of plate 39 to which power source 21 is mounted.

Referring now to FIGS. 4-7, the particulars of the cutting assembly 19 are more clearly illustrated. Specifically, assembly 19 comprises a drive shaft 83 and a bearing housing 85 within which shaft 83 rotates. Referring to FIG. 5, the elements contained within bearing housing 85 are shown. Contained therein are a pair of roller bearings 87 which are positioned near each of the ends of the housing. The bearings 87 are held in position on their outboard side by an expandable ring 89 which fits within a groove in the housing, and at their inboard side by an enlarged portion 91 of the shaft 83. At each end of the housing 85, outboard of the bearings 87 and rings 89, there is provided a grease seal 93. Preferably, the housing 85 also includes a grease fitting 95 to ensure a proper supply of grease to the bearings 87. Although in the preferred embodiment the housing 85 contains roller bearings, it will be appreciated that any one of a variety of bearing types may be utilized including needle, tapered, ball and the like.

Welded to the outside diameter of the housing 85 is a flange 97 which facilitates the attachment of the cutter assembly 19 to the angled portion 49. In the context of the preceeding discussion, such attachment of the cutting assembly 19 to the angled portion 49 results in the shaft 83 being oriented at an angle of from approximately 19 degrees to 39 degrees, or preferably approximately 29 degrees relative to a vertical line 99 which extends parallel to the side plates 27 and 29 of housing 17. Such an angle of orientation results in the formation of an angle of from approximately 51 degrees to 71 degrees, or preferably 61 degrees between the axis of the drive shaft 83 and the horizontal surface of the ground upon which the stump remover is positioned. Flange 97 is secured to angled plate 49 utilizing a plurality of threaded bolts and nuts 101. Preferably, input pulley 81 is secured to shaft 83 by a pair of threaded fittings (not illustrated).

At one end drive shaft 83 includes a threaded portion 103 which is adapted to receive a locknut 105 and cotter pin 107 to further ensure that pulley 81 remains secure on shaft 83. Formed at the other end of the shaft is a flange 109. Flange 109 provides a mounting base for the cutting teeth 111. Cutting teeth 111 are radially disposed along the diameter of flange 109 at equal distances such that a 90 degree angle is formed between the major horizontal axis of each of the teeth 111. The teeth 111 are held in position upon the flange 93 by a retainer 117 having grooves formed therein which are adapted to receive the teeth 111. The retainer 117 clamps the teeth 111 to the flange by way of a plurality of equally spaced bolt and nut assemblies 121. To further ensure that the teeth 111 are held in position, each of the teeth 111 is attached to retainer 117 by a recessed threaded bolt 118. Preferably, as illustrated, all elements attached to flange 109 are equally spaced and of equal weight to ensure the balanced rotation of shaft 83 and thus minimize the load on bearings 87. The diameter which teeth 111 span is preferably less than seven inches.

Teeth 111 are bent to form downwardly extending leg portions 125. Preferably, to maximize cutting and grinding performance leg portions 125 form an angle of approximately 45 degrees with flange 109 which is parallel with the angled portion 49 of leg 45, or alternatively, to form an angle of approximately 45 degrees with the axis of the drive shaft 83. At the end of the leg portion 125, there is provided a carbide tip 127 which radically extends the service life of teeth 111. Preferably, to ensure the secure attachment of the carbide tips 127 to their respective teeth 111, each of the teeth 111 includes a groove 130 into which its respective carbide tip is fitted and braized.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

I claim:

1. A portable stump remover for cutting and grinding away a tree stump or limb situated within the ground comprising a rectangular-shape housing having a fore and an aft end and a horizontal top plate, a pair of side plates and a fore end plate, said fore end of said housing including a fixed bottom inclined angled plate extending upwardly from one side plate to the other, cutter means to facilitate the cutting and grinding of such stump or root mounted near the fore end of said housing, power means mounted upon said top plate of said housing near the aft end of said housing to provide the requisite rotational force to said cutter means, and wheel means to support said housing above ground level and facilitate the portable movement of the stump remover, said wheel means being mounted and supporting said housing near the aft end of said housing slightly behind the center of gravity of said power means such that said housing tends to rotate forward upon said wheel means causing said cutter means to contact such root or stump, said power means comprising an internal combustion engine having a horizontal stroke piston, said cutter means comprising a drive shaft supported for rotation within a bearing housing fixed to said inclined angled plate, said drive shaft including at one end a plurality of teeth for cutting and grinding such tree stump or root, and said axis of said drive shaft forming an angle of approximately 19 to 39 degrees with respect to a vertical plane extending fore and aft said housing.

2. A portable stump remover as set forth in claim 1 wherein said wheel assembly comprises an axle extending through and mounted to said side plates of said rectangular-shape housing, said axle having a pneumatic wheel mounted at each end thereof.

3. A portable stump remover as set forth in claim 1 further including a cog V-bolt to transmit such rotational force from said internal combustion engine to said cutter means.

4. A portable stump remover as set forth in claim 3 wherein said plurality of teeth is four in number radially extending and equally spaced at the end of said drive shaft.

5. A portable stump remover as set forth in claim 4 wherein said teeth are all bent downwardly in a common direction to form a bent portion, said bent portion of said teeth forming an angle of approximately 45 degrees with respect to the axis of said drive shaft.

6. A portable stump remover as set forth in claim 5 further including a handle assembly mounted to the aft end of said rectangular housing.

7. A portable stump remover as set forth in claim 6 further including a footrest mounted at the aft end of said housing which extends downwardly and rearwardly from said aft end of said housing.

8. A portable stump remover as set forth in claim 5 wherein said bent portion of said teeth each include a carbide tip to extend the service life of said teeth.

9. A portable stump remover as set forth in claim 8 wherein said inclined angled plate includes a leg which protrudes beyond the confines of said housing and serves to capture flying chips of wood generated by said cutter means.

10. A portable stump remover as set forth in claim 9 wherein said drive shaft is perpendicular to said inclined angle plate whereby said angled plate forms an angle with respect to the top plate of said housing which is equal to said angle formed between said drive shaft and such vertical plane.

11. A portable stump remover as set forth in claim 10 wherein said cog V-belt and said bearing housing of said cutter means are contained within the confines of said rectangular-shape housing.

12. A portable stump remover as set forth in claim 8 wherein said aft end of said housing includes a hinged piece of plastic matting to protect the feet of the user from flying debris emanating from said cutter means.

* * * * *